3,178,344
ALEURITIC GLUCOSAMIDE AND COMPOSITIONS CONTAINING THE SAME
Harry H. Le Veen, 85—35 Midland Parkway,
Jamaica, N.Y.
No Drawing. Filed Jan. 22, 1963, Ser. No. 253,063
2 Claims. (Cl. 167—58)

The invention relates to a new water soluble fat composition and method for preparing it.

More particularly, the invention relates to the glucosamide of aleuritic acid which may be prepared by the interaction of 2-amino-α-glucose (2-amino-2-deoxy-D-glucose) with a lower alkyl ester of aleuritic acid in the presence of a condensation catalyst, such as an alkali metal alkoxide.

It is an object of the invention to make available a water soluble fat composition capable of providing adequate caloric intake to maintain weight, health and nitrogen balance.

It is a further object of the invention to provide a fat composition suitable for parenteral administration in aqueous solution when normal ingestive methods are impaired or curtailed.

There is an urgent need for an infusion substance of high caloric value which can be used to maintain patients in caloric and nitrogen balance when they are unable to take food by mouth. Glucose can be administered parenterally but excessive quantities of water must be administered if 5% glucose is used. Such quantities of fluid exceed the patient's tolerance for water. If higher concentrations of glucose are used, the solution becomes hypertonic and is so irritating to the veins that thrombosis ensues. Also, hypertonic glucose is spilled in the urine and serious shifts of intra and extracellar fluid occur. The magnitude of these fluid shifts are often fatal.

The ideal high caloric material should be fat, but fat is not water soluble. It must therefore be emulsified in an aqueous medium. To prepare stable emulsions in vitro emulsifying agents must be used. It has been shown that these agents are toxic in direct proportion to their ability to lower surface tension. (Le Veen, H. H., Papps, G., Restuccia, M., Problems in the Intravenous Administration of Synthetic and Natural Fats for Nutritional Purposes, Am. J. Digest Disease 17:20, 1950). Le Veen also pointed out that a water soluble synthetic fat-like substance might be synthesized. The synthetic material must not have a polar-nonpolar configuration since such compounds have high surface activity and, while they are good detergents, they are toxic when given parenterally.

By using mildly toxic emulsifying agents such as phospholipids, stable fatty emulsions have been manufactured. Le Veen has shown that the sera of patients frequently cause these emulsions to break and that their removal from the blood stream frequently takes place by aggregation and embolization (Le Veen, H. H., Giordano, P., and Spletzer, J., The Mechanism of Removal of Intravenously Injected Fat, Arch. Surgery 83:311, 1961). The problems of fat emulsions involve more than making an emulsion which is stable in vitro.

Unpublished studies show that aleuritic acid, a 9,10,16-trihydroxy palmitic acid is metabolized by rat and human liver in a manner similar to palmitic acid, but at a slower rate. Tissue culture growth of fibrolasts was found not only to be supported by aleuritic acid but actually accelerated by it. Experiments on whole animals show that aleuritic acid can be used as a source of calories.

The polar groups (hydroxyl groups) along the chains of the aleuritic acid molecule render this fatty acid more polar than the non-hydroxylated acid. The free acid is not soluble in the usual lipid solvents such as chlorinated hydrocarbons but is soluble in methanol. Water soluble derivatives of aleuritic acid do not have the polar-nonpolar properties of detergents and are therefore not toxic. Several esters and amides have been synthesized. Some were found to be water soluble. Some of the mono esters of polyalcohols, sugars and sugar derivatives, although water soluble and non-toxic, were unsuitable because the alcohol portion was not metabolized or it was excreted in the urine. The glucose ester therefore seemed to be a suitable choice. Studies done on the glucose ester of aleuritic showed it to be non-toxic and completely metabolized. Parenteral injections supported the growth and development of rats on diets inadequate in calories. (Le Veen, H. H., Parenteral Calories From a Synthetic Water Soluble Fat, Surgery, Gynecology & Obstertrics 102:154, 1956; Le Veen, H. H., The Metabolic Availability of Glucose Monoaleuritate, Am. J. Clin. Nutrition 5:251, 1957; Le Veen, H. H., U.S. patent application Serial No. 635,609, January 23, 1957, and now abandoned). Because of the polyfunctional nature of the reactants, the synthesis of glucose monoaleuritate was difficult and there was a predisposition to resin formation. The amides, on the other hand, were more easily synthesized. The amide linkage is easily ruptured in the body as occurs in the hydrolysis of polypeptides. The glucosamide of aleuritic acid can be prepared from commercially available glucosamine (2-amino-α-glucose) and aleuritic acid.

The molecular size of glucosamide of aleuritic acid is so large that the compound is not as hypertonic as high concentrations of glucose, and 10–15% solutions have been administered without sclerosis of veins in animals. The molecular size also makes it of value as an emulsion stabilizer for use with oil soluble drugs. Since it is completely metabolized it is more suitable for this purpose than Carbowax. The glucosamide of aleuritic acid can be stored in the dry state and reconstituted as a 13% aqueous solution for intravenous use before administration.

The following is a suitable method of synthesis of the new water soluble fat:

Commercial aleuritic acid is purified by repeatedly crystallizing it from methanol. The aleuritic acid is dissolved in absolute methanol and water is gradually added. The aleuritic acid comes out of solution as a crystalline precipitate. Meythyl aleuritate is prepared from the purified aleuritic acid. The Emil Fischer synthesis using methanol and dry HCl gas as the catalyst is satisfactory.

All water is removed from the methyl aleuritate by azeotropic distillation with benzene. The free base of glucosamine (2-amino-glucose) is similarly dehydrated. The dried precursors are reacted in equimolecular proportions in dry methanol using sodium methoxide as a catalyst in an amount constituting about 5% of the amount of the reactants. After about 8 hours at 50° C., the reaction mixture is passed through an ion exchange resin to strip it of the remaining catalyst. The methanol is then removed under vacuum to yield the solid white glucosamide of aleuritic acid.

I claim:
1. The glucosamide of aleuritic acid.
2. A parenterally administrable fat composition comprising an aqueous solution of the glucosamide of aleuritic acid.

References Cited by the Examiner

UNITED STATES PATENTS

| | | | |
|---|---|---|---|
| 2,703,798 | 3/55 | Schwartz | 260—211 |
| 2,717,894 | 9/55 | Schwartz | 260—211 |
| 2,976,275 | 3/61 | Pollitzer | 250—211 |
| 2,977,283 | 3/61 | Meyer et al. | 167—58 |
| 3,014,027 | 12/61 | Druey et al. | 260—211 |
| 3,067,098 | 12/62 | Pool | 167—58 |
| 3,118,875 | 1/64 | Adams | 260—211 |

LEWIS GOTTS, *Primary Examiner.*

FRANK CACCIAPAGLIA, Jr., *Examiner.*